United States Patent [19]
Schaller et al.

[11] 3,785,682
[45] Jan. 15, 1974

[54] FLEXIBLE FITTINGS FOR CORRUGATED TUBING

[75] Inventors: Willard W. Schaller, Maumee, Ohio; Ronald C. Martin, Newark, Del.; Marty E. Sixt, Napoleon, Ohio

[73] Assignee: Advanced Drainage Systems, Inc., Newark, Del.

[22] Filed: Nov. 17, 1970

[21] Appl. No.: 90,486

Related U.S. Application Data

[63] Continuation of Ser. No. 809,117, March 21, 1969, abandoned.

[52] U.S. Cl.................. 285/24, 285/156, 285/305, 285/423, 285/DIG. 4, 285/DIG. 22
[51] Int. Cl............................................. F16l 35/00
[58] Field of Search................... 285/156, 369, 417, 285/DIG. 4, DIG. 22, 305, 399, 24, 463; 138/89, 96, 96 T

[56] References Cited
UNITED STATES PATENTS

| 944,985 | 12/1909 | Pankhurst..................... 285/DIG. 4 |
| 1,853,945 | 4/1932 | Unke................................. 138/96 T |
| 1,860,886 | 5/1932 | Brownstein....................... 138/96 T |
| 2,366,067 | 12/1944 | Smith........................... 285/DIG. 22 |
| 2,537,284 | 1/1951 | Schuder....................... 285/DIG. 22 |

FOREIGN PATENTS OR APPLICATIONS

| 1,211,966 | 10/1959 | France................................. 285/156 |
| 376,004 | 7/1932 | Great Britain................... 138/96 T |

*Primary Examiner*—Dave W. Arola
*Attorney*—Connolly & Hutz

[57] ABSTRACT

Flexible coupling for interconnecting ends of corrugated tubing comprises straight-walled tubular body section having substantially uniform thickness throughout. Each of plurality of locking lugs formed in tubular body section at one end thereof projects into interior of tubular body section and has guiding surface portion across which corrugated tubing slides when tubing is inserted into tubular body section for connection thereto. Locking lugs have abutment surface portions adjacent guiding surface portions for preventing removal of corrugated tubing from tubular body section. Each locking lug is positioned between adjacent pair of corrugations in tubing inserted into tubular body section after first corrugation of adjacent pair clears guiding surface portion. Removal of tubing is prevented by engagement between first corrugation of adjacent pair and abutment surface portions of locking lugs.

4 Claims, 5 Drawing Figures

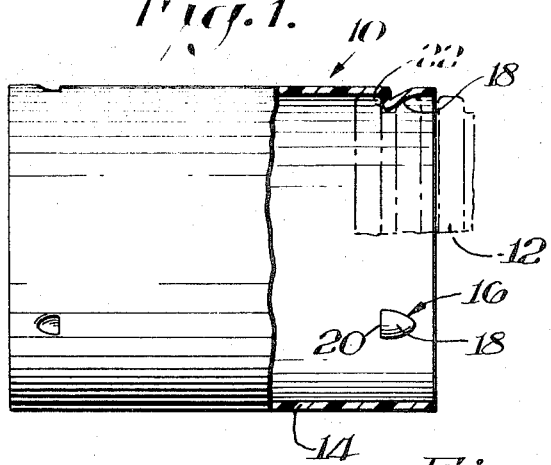
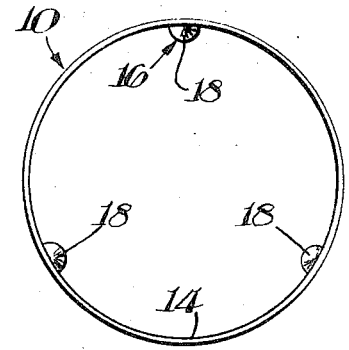
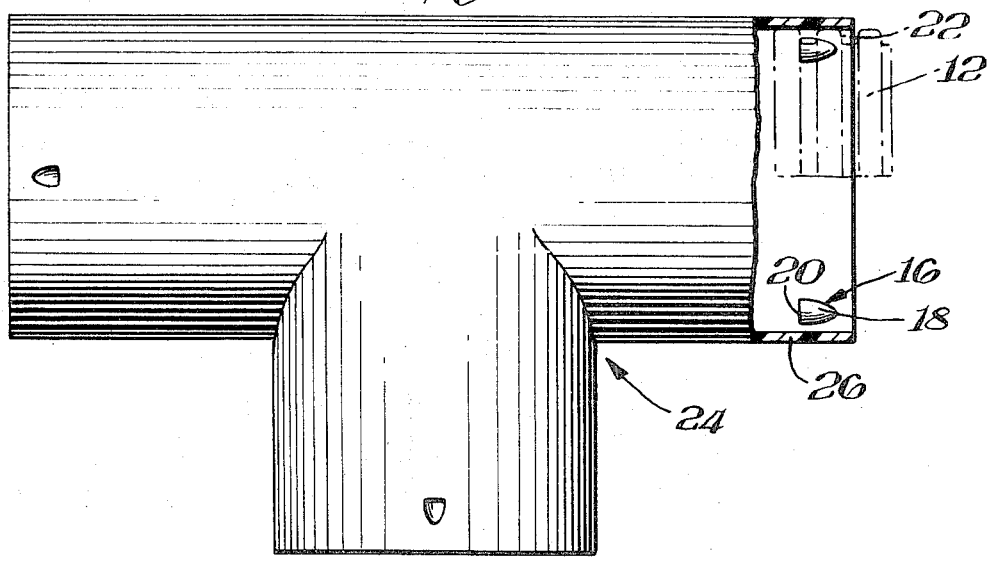
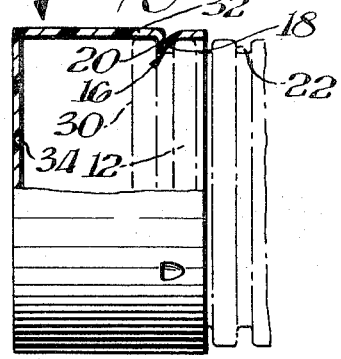
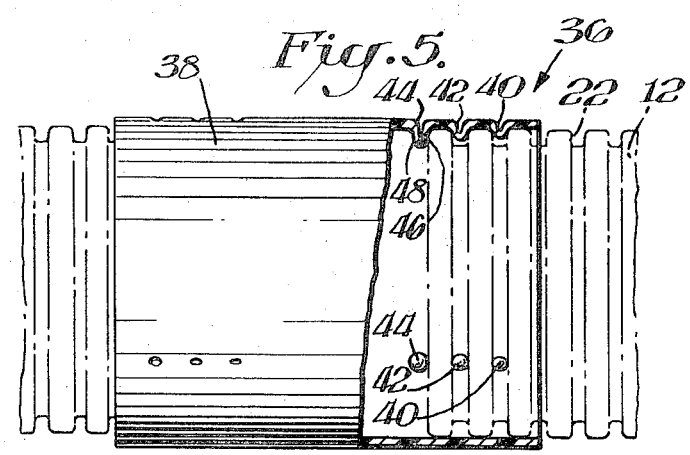

FLEXIBLE FITTINGS FOR CORRUGATED TUBING

This application is a streamline continuation of application Ser. No. 809,117, filed Mar. 21, 1969, and now abandoned.

BACKGROUND OF THE INVENTION

The present invention relates to fittings for corrugated tubing, and more particularly to flexible couplings for interconnecting the ends of corrugated tubes, and flexible end caps for closing-off the open ends of such tubing.

Subsurface drainage systems fabricated from corrugated tubs are currently playing a major role in land development and improvement. The advantages of corrugated drainage systems over the heretofore commonly used red clay tile networks are quite numerous. The ease with which corrugated tubes are manufactured in continuous lengths together with the rather simple and inexpensive installation procedures are but a few factors which have contributed to the overwhelming commercial success of corrugated drainage systems. For the most part, such systems include main and lateral subsurface drainage lines comprising corrugated tubing, tees, wyes, couplings or connectors, and adapters of one type or another. A typical system usually comprises a series of inclined lateral lines spaced from one another in parallel fashion on opposite sides of an inclined main line to which the laterals are connected by either tees or wyes. The main and lateral lines may be quite long and therefore require the piecing together of various lengths of tubing. End caps are also needed to close the open ends of the main and lateral lines and thereby prevent the surrounding earth from entering into the drainage system.

In most instances the various components of the subsurface drainage system are assembled and connected together insitu at the time the system is installed. Thus, it is important to have fittings, such as couplings and end caps, which are easy and simple to use so that the installation procedure can be carried out in an efficient manner. Moreover, it is critical that these fittings function in the manner for which they were intended in order to eliminate troublesome and costly problems which may otherwise arise after the system is installed and the backfilling operation completed.

Accordingly, it is an object of the present invention to provide fittings for corrugated tubes which are simple in design, easy to install, and highly reliable.

Another object of the present invention is to provide a simple and highly dependable flexible coupling for interconnecting the ends of corrugated tubes.

Still another object of the present invention is to provide a flexible end cap which functions to close-off the open end of a corrugated tube.

SUMMARY OF THE INVENTION

In accordance with the present invention a flexible coupling is provided for interconnecting the ends of corrugated tubes. The coupling comprises a straight-walled tubular body section having a substantially uniform thickness throughout. A plurality of locking lugs is formed in the tubular body section at one end thereof. Each locking lug projects into the interior of the tubular body section and includes a guiding surface portion across which corrugated tubing slides when it is inserted into the tubular body section for connection thereto. Abutment surface portions adjacent the guiding surface portions prevent removal of corrugated tubing from the tubular body section. The locking lugs are positioned between an adjacent pair of corrugations in the tubing inserted into the tubular body section after the first corrugation of that adjacent pair clears the guiding surface portions of the lugs. Removal of the tubing is prevented by engagement between the first corrugation of the adjacent pair and the abutment surface portions of the locking lugs.

The abutment surface portion of each locking lug may be planar, and the guiding surface portion thereof inclined to cam corrugated tubing into the tubular body section. Moreover, the planar abutment surface portion of each locking lug may be normal to the longitudinal axis of the tubular body section at the end thereof where the locking lugs are located. Alternatively, the guiding surface portion of each locking lug may be rounded. In either instance, the tubular body section takes a variety of different forms depending upon its function and particular location in the overall system. For example, the tubular body section may be T-shaped or simply have a cylindrical outer configuration.

In one embodiment of the present invention, the plurality of locking lugs includes at least a pair of lugs spaced from one another in a line substantially parallel to the longitudinal axis of the tubular body section at the end thereof where the lugs are located. The locking lug closest to the end of the tubular body section where the lugs are located projects into the interior of the tubular body section at distance slightly less than the other locking lug of the aligned pair. More particularly, the plurality of locking lugs can include three equally spaced apart groups with three equally spaced apart lugs in each group. Each group of lugs is arranged in a line substantially parallel to the longitudinal axis of the tubular body section at the end thereof where the lugs are located. The lugs in each group project into the interior of the tubular body section at progressively increasing distances from the end thereof where they are located.

The flexible end cap of the present invention seals and covers the open end of a corrugated tube. The end cap comprises a tubular body section with a closure at one end thereof and a plurality of locking lugs at the opposite open end. Each locking lug is positioned between the adjacent pair of corrugations in the tubing inserted into the tubular body section after the first corrugation of the adjacent pair clears the guiding surface portion of the lug. Removal of the tubing is prevented by engagement between the first corrugation of the adjacent pair and the abutment surface portions of the locking lugs. Moreover, the abutment surface portion of each locking lug may be planar and the guiding surface portion thereof inclined to cam corrugated tubing into the tubular body section. Also, the planar abutment surface portion of each locking lug can be normal to the longitudinal axis of the tubular body section at the end thereof where the locking lugs are located.

BRIEF DESCRIPTION OF THE DRAWING

Novel features and advantages of the present invention in addition to those noted above will become apparent to one skilled in the art from a reading of the following detailed description in conjunction with the accompanying drawing wherein similar reference characters refer to similar parts and in which:

FIG. 1 is a side elevational view of a flexible coupling according to the present invention with a portion thereof broken away to illustrate the interior of the coupling;

FIG. 2 is an end elevational view of the coupling shown in FIG. 1;

FIG. 3 is a top plan view of a T-shaped flexible coupling according to the present invention with portions thereof broken away to illustrate the interior of the coupling;

FIG. 4 is a side elevational view of a flexible end cap according to the present invention with portions thereof broken away to illustrate the interior of the end cap; and FIG. 5 is a side elevational view of another flexible coupling according to the present invention with a portion thereof broken away to illustrate the interior of the coupling.

DETAILED DESCRIPTION OF THE INVENTION

Referring in more particularity to the drawing, FIGS. 1 and 2 illustrate a flexible coupling 10 for interconnecting the ends of corrugated tubes 12. The coupling comprises a straight-walled tubular body section 14 having a substantially uniform thickness throughout. Preferably, the tubular body section is fabricated from thermoplastic material by molding techniques known in the art, such as, for example, extrusion procedures. A plurality of locking lugs 16 is formed in the tubular body section 14 at the open opposite ends thereof. Numerous procedures may be followed for forming the locking lugs in the tubular body section, such as suction or blow molding techniques. Each locking lug 16 projects into the interior of the tubular body section 14 and includes a guiding surface portion 18 across which the corrugated tubing 12 slides when it is inserted into the tubular body section 14 for connection thereto. An abutment surface portion 20 located adjacent the guiding surface portion 18 of each locking lug 16 prevents removal of the corrugated tubing from the tubular body section after it is inserted therein.

In operation, the flexible coupling 10 functions to positively interconnect the ends of corrugated tubes 12 by locking them to the coupling. This is accomplished by forcing the ends of the corrugated tubes into the open ends of the tubular body section 14. Initially, the corrugated tubing strikes the guiding surface portions 18 of the locking lugs 16 and as the tubing is urged into the tubular body section 14 of the coupling it slides across the guiding surfaces. The internal dimension defined by the locking lugs 16 is slightly smaller than the external dimension of the tubing to be connected to the coupling 10. The flexible nature of the coupling together with the flexibility of the corrugated tubing enables the tubing to enter into the coupling and slide past the locking lugs 16. Finally, each of the locking lugs is positioned between an adjacent pair of corrugations in the tubing 12 after the first corrugation of that adjacent pair clears the guiding surface portions 18. Removal of the tubing is prevented through engagement between the first corrugation of the adjacent pair and the abutment surface portions 20 of the locking lugs 16. The identical procedure is utilized for connecting another length of corrugated tubing to the opposite end of the flexible coupling 10.

As shown in FIGS. 1 and 2, the abutment surface portion 20 of each locking lug 16 is planar and the guiding surface portion 18 is inclined so as to cam the corrugated tubing into the tubular body section 14. The planar abutment surface portion 20 of each locking lug 16 is substantially normal to the longitudinal axis of the tubular body section 14. Thus, with corrugated tubing having substantially flat interconnecting portions 22 between the peaks and valleys in the tubing the planar abutment surface portions 20 engage the flat portions 22 of the tubing to thereby resist removal of the tubes from the flexible connector 10.

A T-shaped coupling 24 according to the present invention is illustrated in FIG. 3. Basically, the flexible coupling 24 has a T-shaped tubular body section 26 and each of the three ends thereof has a plurality of locking lugs 16. The lugs 16 have the same configuration and orientation as the locking lugs described above in conjunction with FIGS. 1 and 2. Moreover, the locking lugs 16 of the T-shaped flexible coupling 24 function in the same manner to resist removal of the corrugated tubing connected thereto. Accordingly, further description of the structure and function of the flexible coupling 24 is not deemed necessary.

FIG. 4 illustrates a flexible end cap 28 for covering the open end 30 of a corrugated tube 12. The flexible cap 28 has a tubular body section 32 with a closure 34 at one end thereof. A plurality of locking lugs 16 is formed in the opposite open end of the tubular body section 32 and each lug projects into the interior of the tubular body section 32 in the same manner as described above. The lugs 16 include guiding surface portions 18 and abutment surface portions 20 for guiding and locking the corrugated tube 12 to the end cap 28. When the end cap 28 is snapped onto the open end 30 of the corrugated tubing 12 to effectively close-off and seal that end of the tubing, the locking lugs 16 enter between the corrugations in the tubing in the same manner as described above to thereby prevent removal of the end cap from the open end 30 of the tubing.

Another flexible coupling 36 of the present invention comprises a straight-walled tubular body section 38 having a substantially uniform thickness throughout, as shown in FIG. 5. Each end of the coupling has a plurality of locking lugs that project into the interior of the body section 38. Specifically, the plurality of lugs at each end of the flexible coupling includes three equally apart groups with three equally spaced apart locking lugs 40, 42, 44 in each group. The lugs in each group are arranged in a line substantially parallel to the longitudinal axis of the tubular body section 38 and are formed as rounded depressions therein. As shown in FIG. 5, the locking lugs in each group project into the interior of the tubular body section 38 at progressively increasing distances from the end thereof where they are located. Each lug has a guiding surface portion 46 and an abutment surface portion 48. Thus, when the tubing 12 is forced into the coupling 36 the locking lugs become positioned between the corrugations in the tubing. The locking lugs resist removal of the tubing from the coupling through engagement of the abutment surfaces 48 and the flats 22 on the tubing 12. The arrangement of FIG. 5 compensates for slight variations in the cross-sectional dimensions of the tubing 12 and the flexible coupling 36. This particular arrangement assures that at least one of the locking lugs of each group will be positioned in blocking relationship between the corrugations in the tubing 12 when the tubing is forced into the flexible coupling 36. Removal of the tubing from the coupling is thereby prevented.

What is claimed is:

1. A flexible coupling for interconnecting the ends of corrugated tubes comprising a straight-walled tubular body section having a substantially uniform thickness throughout, a plurality of locking lugs formed in the tubular body section at one end thereof, each locking lug projecting into the interior of the tubular body section and including a guiding surface portion across which corrugated tubing slides when it is inserted into the tubular body section for connection thereto, and an abutment surface portion adjacent the guiding surface portion for preventing removal of corrugated tubing from the tubular body section, each locking lug being positioned between an adjacent pair of corrugations in tubing inserted into the tubular body section after the first corrugation of the adjacent pair clears the guiding surface portion whereby removal of the tubing is prevented by engagement between the first corrugation of the adjacent pair and the abutment surface portions of the locking lugs, and the plurality of locking lugs including at least a pair of lugs spaced from one another in a line substantially parallel to the longitudinal axis of the tubular body section at the end thereof where the lugs are located, the locking lug closest to that end of the tubular body section projecting into the interior of the tubular body section a distance slightly less than the other locking lug of the aligned pair.

2. A flexible coupling as in claim 1 wherein the plurality of locking lugs includes three equally spaced apart groups with three equally spaced apart lugs in each group, each group of lugs being arranged in a line substantially parallel to the longitudinal axis of the tubular body section at the end thereof where the lugs are located, and the lugs in each group projecting into the interior of the tubular body section at progressively increasing distances from the end thereof where they are located.

3. A flexible coupling for interconnecting corrugated tubes comprising an imperforate body section with a plurality of locking lugs formed therein at one end thereof, each locking lug projecting into the interior of the body section and including a guiding surface portion across which corrugated tubing slides when it is inserted into the body section for connection thereto, and an abutment surface portion adjacent the guiding surface portion for preventing removal of corrugated tubing from the body section, each locking lug being positioned between an adjacent pair of corrugations in tubing inserted into the body section after the first corrugation of the adjacent pair clears the guiding surface portion whereby removal of the tubing is prevented by engagement between the first corrugation of the adjacent pair and the abutment surface portions of the locking lugs, and the plurality of locking lugs including at least a pair of lugs spaced from one another in a line substantially parallel to the longitudinal axis of the body section at the end thereof where the lugs are located, the locking lugs closest to that end of the body section projecting into the interior of the body section a distance slightly less than the other locking lug of the aligned pair.

4. A flexible coupling as in claim 3 wherein the plurality of locking lugs includes three equally spaced apart groups with equally spaced apart lugs in each group, each group of lugs being arranged in a line substantially parallel to the longitudinal axis of the body section at the end thereof where the lugs are located, and the lugs in each group projecting into the interior of the body section at progressively increasing distances from the end thereof where they are located.

* * * * *